United States Patent
Paskins

(10) Patent No.: US 7,890,975 B2
(45) Date of Patent: *Feb. 15, 2011

(54) DATA BROADCAST METHOD

(75) Inventor: Adrian Charles Paskins, Basingstoke (GB)

(73) Assignee: Sony United Kingdom Limited, England (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/714,115

(22) Filed: Feb. 26, 2010

(65) Prior Publication Data

US 2010/0162311 A1    Jun. 24, 2010

Related U.S. Application Data

(63) Continuation of application No. 09/630,971, filed on Aug. 1, 2000, now Pat. No. 7,685,618.

(30) Foreign Application Priority Data

Aug. 3, 1999    (GB) ................... 9918284.2

(51) Int. Cl.
H04N 7/10    (2006.01)
H04N 5/445    (2006.01)
H04N 7/173    (2006.01)

(52) U.S. Cl. .............. 725/41; 725/32; 725/54

(58) Field of Classification Search ........... 725/32, 725/41, 134, 54
See application file for complete search history.

(56) References Cited

U.S. PATENT DOCUMENTS 5,619,247 A    4/1997    Russo (Continued)

FOREIGN PATENT DOCUMENTS

EP    0 749 244    12/1996

(Continued)

OTHER PUBLICATIONS

Pekowsky S et al: "The Set-Top Box as Multi-Media Terminal" IEEE Transactions on Consumer Electronics, IEEE Inc. New York, US, vol. 44, No. 3, Jun. 1998, pp. 833-840, XP000668933 ISSN: 0098-3063.

(Continued)

*Primary Examiner*—James Sheleheda
(74) *Attorney, Agent, or Firm*—Oblon, Spivak, McClelland, Maier & Neustadt, L.L.P.

(57) ABSTRACT

A system for providing a plurality of sets of broadcast data service transmitted as part of a broadcast signal, including a processor configured to periodically extract at least some of the plurality of sets of the broadcast data service from a broadcast carousel included in the broadcast signal, a memory configured to store the extracted plurality of sets of the broadcast data service, defining a plurality of digital-audio/video-data-sets including television clips, a first controller configured to allow selection from a list of the plurality of sets of the digital-audio/video-data-sets, and a second controller responsive to a user initiated selection signal to cause the memory to output a user selected one of the plurality of digital-audio/video-data-sets selected from the list, wherein the processor converts the digital-audio/video-data of the plurality of sets of the broadcast data service into real time audio/video data, and updates portions of data related to the stored extracted plurality of sets.

43 Claims, 2 Drawing Sheets

U.S. PATENT DOCUMENTS

| | | |
|---|---|---|
| 5,619,274 A | 4/1997 | Roop et al. |
| 5,673,401 A | 9/1997 | Volk et al. |
| 5,729,549 A | 3/1998 | Kostreski et al. |
| 5,737,595 A | 4/1998 | Cohen et al. |
| 5,768,539 A | 6/1998 | Metz et al. |
| 5,790,935 A | 8/1998 | Payton |
| 5,805,825 A | 9/1998 | Danneels et al. |
| 5,886,995 A | 3/1999 | Arsenault et al. |
| 5,966,120 A | 10/1999 | Arazi et al. |
| 5,968,132 A | 10/1999 | Tokunaga et al. |
| 5,970,249 A | 10/1999 | Holzle et al. |
| 6,005,599 A | 12/1999 | Asai et al. |
| 6,029,045 A | 2/2000 | Picco et al. |
| 6,177,931 B1 | 1/2001 | Alexander et al. |
| 6,269,394 B1 | 7/2001 | Kenner et al. |
| 6,419,137 B1 | 7/2002 | Marshall et al. |
| 6,434,653 B1 | 8/2002 | Winston |
| 6,453,471 B1 | 9/2002 | Klosterman |
| 6,591,419 B2 | 7/2003 | Barry et al. |
| 6,698,020 B1 | 2/2004 | Zigmond et al. |
| 6,701,526 B1 | 3/2004 | Trovato |
| 7,284,261 B1 | 10/2007 | Connelly |
| 7,685,618 B1 * | 3/2010 | Paskins .................. 725/41 |
| 2002/0016963 A1 | 2/2002 | Inoue et al. |

FOREIGN PATENT DOCUMENTS

| | | |
|---|---|---|
| EP | 0 854 649 | 7/1998 |
| EP | 0874486 | 10/1998 |
| EP | 0921681 | 6/1999 |
| EP | 1 024 661 | 8/2000 |
| GB | 2316563 | 2/1998 |
| GB | 2331884 | 6/1999 |
| JP | 7-44392 A | 2/1995 |
| JP | 8-32530 A | 2/1996 |
| JP | 11-55636 A | 2/1999 |
| JP | 11-145918 | 5/1999 |
| JP | 11-146353 A | 5/1999 |
| JP | 11-196390 A | 7/1999 |
| WO | WO 94 13107 | 6/1994 |
| WO | WO 97 01930 | 1/1997 |
| WO | WO 97/18669 | 5/1997 |
| WO | WO 98/57497 | 12/1998 |

OTHER PUBLICATIONS

Alberico G et al: "Satellite Interactive Multimedia: A New Opportunity for Broadcasters" International Broadcasting Convention, GB, London, Sep. 1997, pp. 18-23, XP000668925.

U.S. Appl. No. 12/714,102, filed Feb. 26, 2010, Paskins.

* cited by examiner

DATA BROADCAST METHOD

CROSS-REFERENCE TO RELATED APPLICATIONS

This application is a continuation of and claims the benefit of priority under 35 U.S.C. §120 from U.S. patent application Ser. No. 09/630,971, filed Aug. 1, 2000, the entire content of which is incorporated herein by reference. U.S. application Ser. No. 09/630,971 claims the benefit of priority under 35 U.S.C. §119 from United Kingdom Patent Application No. 9918284.2, filed Aug. 3, 1999.

BACKGROUND OF THE INVENTION

1. Field of the Invention

The present invention relates to a data broadcast system and method and, more particularly, to a method of broadcasting data services with broadcast signals and a system for selectively providing portions of the broadcast data service to the user.

2. Description of the Related Art

Digital television systems have become widely used for broadcast systems. The digital television systems provide digitisation and compression of the image to be broadcast with technologies such as MPEG-2 compression. The broadcast pictures are hence encoded and conveyed to the digital television receivers in the home as a digital data sequence. Digital television has a number of advantages over conventional analogue television, such as increased capacity and increased robustness to noise and interference.

Digital television systems also allow many kinds of data to be carried seamlessly within broadcasts carrying audio and visual data. Hence, many new services can be provided through the digital TV receiver to the viewer.

A popular analogue service that uses additional data carried within the broadcast transmission is the teletext service. The teletext service is carried as digital data within certain transmission lines of the vertical blanking interval (VBI) of the TV signal. The VBI is the time allowed for the raster scan to return to the top of the screen and hence this time is not used to carry any useful picture information. Some lines are set aside for teletext data and the digital data is modulated onto the broadcast TV signal.

Teletext systems broadcast a number of "pages" of data in cycles with a page being typically updated every 2 to 3 minutes. The update cycle time depends on how many pages are broadcast in the cycle, there being only a small bandwidth available for the teletext data. Upon selecting a page, the viewer has to then wait for the page to be delivered as part of the cycle—this time will be on average half the total cycle time for all the pages.

Typical teletext systems provide the latest news, sport and TV guide information and also reference information and advertising. Teletext systems are very useful for providing "headline" information such as sports results when there is no other means of obtaining the information.

A very popular use for the teletext systems is to find out the latest information for some rapidly changing event such as a sports event. Often this can be the only way the viewer can obtain this information, because sports events are often not screened live, are carried as part of a pay-per-view service or have finished such that the programs are now carrying other content. Hence, this allows the viewer to catch up with "missed" content such as sports events or news broadcasts by other means using the data services.

A problem with previous broadcast data services is that they communicate very little information—perhaps just the score of a football match for instance. The user, although not wanting to see the whole sports event, would like a little more information than just the score—maybe to see video of the goals or near misses in the example of a football match.

However, to provide a service like this there are further problems. Simple data services such as teletext can be provided easily with a low bandwidth. Providing an enhanced data service with audio and visual data would require more bandwidth or take a lot longer to update and cycle the information.

Viewers have different interests and priorities, so what is important to one viewer is of little interest to another. Screening news "highlights" in a sequence that repeats and updates every 15 minutes is not appealing to a viewer if they have one item they would like to see and have to wait an average of 7.5 minutes to see this item.

Digital broadcast systems can provide more bandwidth for program content. However, this bandwidth is still at a premium. Using some of the bandwidth to provide broadcast data services can be considered wasteful, particularly if there is other content that could be screened at the same time to a reasonable audience. Indeed, screening live video and audio as a broadcast data service will still take up approximately 2 Mbit/s of bandwidth using MPEG-2 compression.

OBJECTS AND SUMMARY OF THE INVENTION

It is an object of the present invention to overcome the problems identified above.

According to the present invention, there is provided a method of broadcasting a broadcast data service together with broadcast digital television data as part of a broadcast signal, the broadcast data service including television data. The method comprises broadcasting the television data of the broadcast data service as non-real time data.

In this way, it is possible to allocate a relatively small bandwidth to the broadcast data service and yet allow television clips to be replayed by a receiver as part of the broadcast data service. The television clips may be transmitted in non-real time over an extended period and the data assembled in the receiver for display.

The method may further comprise processing and/or compressing a block of the television data as a whole.

Thus, compared to continuous processing or compression processes such as MPEG, a television clip or sequence may be taken as a whole before compression. This may enable much greater compression to be achieved than for the continuous processes used in normal broadcasting.

The block may comprise data requiring off-line decoding.

In particular, it is possible to compress a block of data representing a television or video sequence, broadcast it in non-real time and then store the data in a memory associated with the receiver. It is then possible to post process or decompress the data off line.

Preferably, the method comprises, during normal broadcasting, only broadcasting portions of the broadcast data service required to replace previous respective portions which have been changed such that receivers of the broadcast signal may store all of the current portions of the broadcast data service and update the stored portions according to replacement portions received with the broadcast signal.

In this way, the bandwidth required for maintaining an enhanced broadcast data service may be reduced, such that the cycle time may also be kept to a minimum. Furthermore, since receivers may use a memory to store the entire broadcast data service, near instantaneous access is possible for the users.

According to the present invention, there is also provided a system for selectively providing portions of a broadcast data service transmitted together with broadcast digital television data as part of a broadcast signal, the portions including data portions having digital television data in non-real time. The system comprises a processor for extracting portions of the broadcast data service available from the broadcast signal, a memory for storing all of the current portions of the broadcast data service and a controller responsive to a selection signal to cause the memory to output selected portions of the broadcast data service. The processor is also for converting the digital television data of data portions into real time data.

In this way, the system can receive television clips, video sequences and the like over the relatively narrow bandwidth used for the broadcast data service and, by storing the relevant portions in the memory, can process those portions to return the data to real time.

Preferably, the digital television data of the data portions is compressed and/or processed and the processor processes the data portions off line.

In this way, it is possible to make further use of the relatively narrow bandwidth available for the broadcast data service. Television data can be compressed to the maximum amount with little regard for the time required for decompression.

Preferably, the processor processes the portions at times of low usage.

The processor may be provided as a separate processor in the storage device.

Thus, the processor can fit in decompression and processing of any previously received compressed/processed television data in amongst its other duties in the operation of the system.

The processor may operate directly on the data in the memory. However, it is also possible for the processor to operate in a batch processing method with data loaded locally from the memory in small chunks. This may be particularly appropriate where the memory is provided separately from the processor and the processor has its own working memory.

The processor may conduct processing using a predefined protocol.

Thus, any processing or compression of the data might make use of an existing protocol such as "WinZip".

Alternatively, the processor could conduct processing using a downloaded protocol. This might provide greater flexibility to a system and/or prevent unauthorised decompression of the data.

Similarly, the processor could conduct off line decryption of data using a key. The key could be downloaded by broadcast or other means such as a memory stick or smartcard.

Preferably the controller is also for identifying corresponding extracted and stored portions and for replacing data portions stored in the memory with respective portions extracted from the broadcast signal.

Thus, at the receiving end, a user's device continually updates the stored complete broadcast data service and is able to retrieve any desired selected portions of the broadcast data service in a near instantaneous manner.

Preferably, the method of broadcasting includes additionally broadcasting all of the current portions of the broadcast data service to enable a user to obtain all portions of the broadcast data service soon after initial connection. This may be achieved by using a separate dedicated channel or by periodically using an expanded bandwidth at a time of low demand for the broadcast digital television data.

The system may be provided with additional means for accessing the complete broadcast data service from a different channel.

In this way, after a receiving system has been disabled for some time or has first been connected, the memory can be filled with the current version of the broadcast data service for future update.

The receiving system may be constructed as a single integral unit comprising a digital television receiver. Alternatively, various components of the system may be constructed separately and linked by means of a network, such as using an IEEE 1394 interface.

In this way, a single television receiver/display could provide all of the functions of the present invention. Alternatively, a television/display could be connected by means of an IEEE 1394 interface with a broadcast data service unit which either has its own receiver or makes use of the receiver of the television display to obtain the broadcast data service portions. Similarly, the memory could be provided in the broadcast data service unit or separately, for instance again connected with an IEEE 1394 interface.

DETAILED DESCRIPTION OF THE PREFERRED EMBODIMENTS

Figure 1:
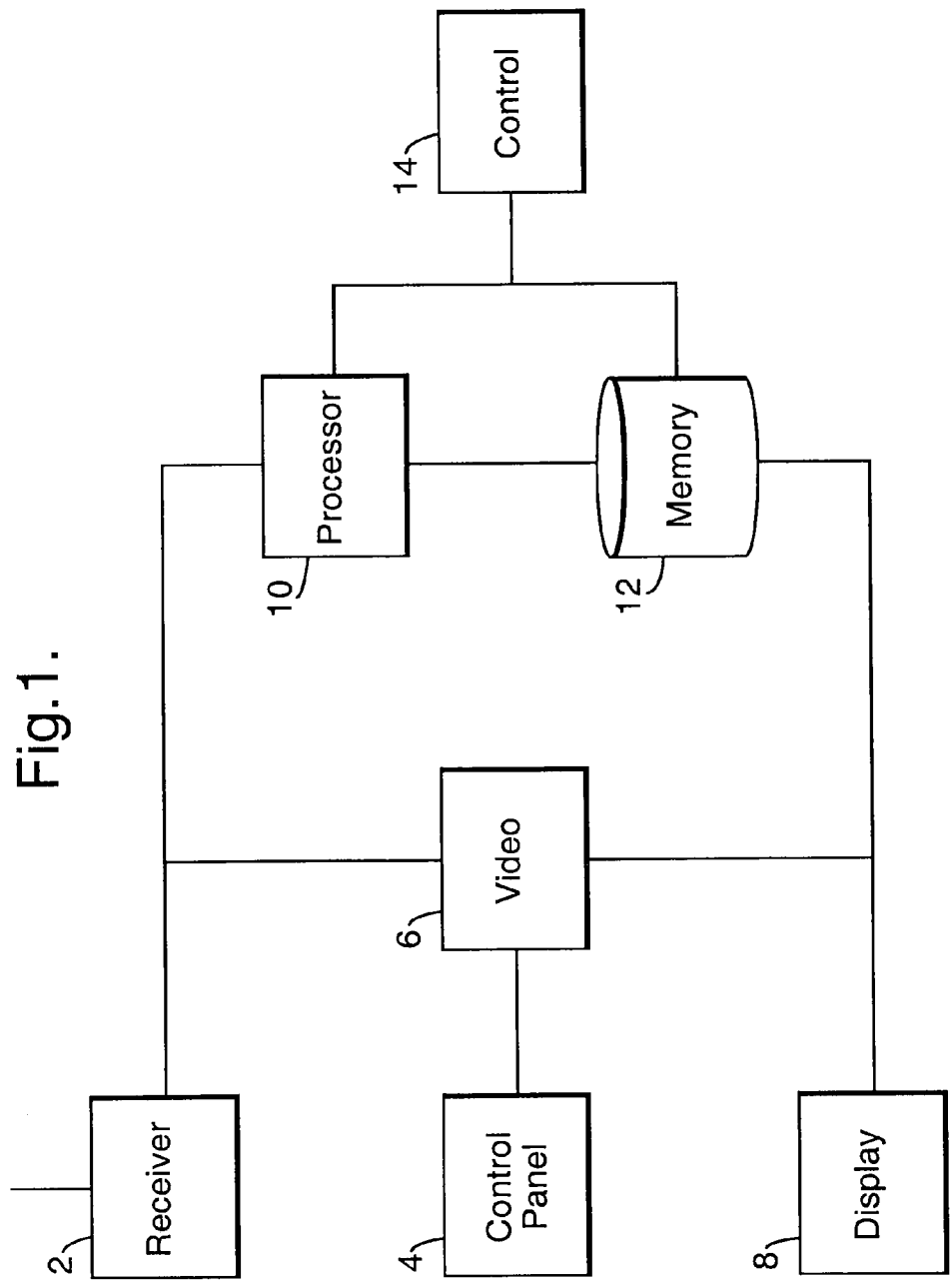
FIG. 1 illustrates a system for receiving broadcast data services according to the present invention.

The invention will be more clearly understood from the following description, given by way of example, with reference to the accompanying drawings.

The MPEG video and audio compression system is designed to provide a maximum amount of compression in a broadcast environment. The MPEG video and audio compression system is also designed to allow the decompression to be carried out with a limited amount of memory in the receiver. This allows the decompression system in the receiver to be implemented with less memory and processing—and hence more cheaply—than the compression system in the transmission head-end.

Even though the digital encoding of information allows many more channels to be transmitted, there is still a limited bandwidth for the transmission of the information. Hence MPEG audio and video channels are constrained to a certain bit rate dependent on the bit rate available.

There is a trade off between the number of channels carried and the video quality (dependent on the bit rate of the compressed video and audio signals) of the channels.

Many new services other than just audio and video services can now also be provided using the digital television broadcasts. Data and information on the transmitted programs and other entirely new services such as home banking or shopping can be provided.

Many of the data services are also carried in a "carousel" where the data is broadcast in a cycle. At any one time only one part of the data service is being broadcast, but over a fixed period—say fifteen seconds or three minutes, all the data will be broadcast. After this period the data is repeated either exactly the same, or with changes if any of the data needs to be changed. This method allows receivers to receive all the data for a service, but allows the data to be transmitted in a relatively small bandwidth.

It is considered that in the broadcast environment, many of the systems used presently are designed to make use of the limited bandwidth available and also assume a limited amount of storage and processing resource in the receiver.

This is indeed true for current systems as the bandwidth is fixed and the receivers have to be implemented as cheaply as possible to be affordable for the average consumer.

Hence the data is broadcast assuming or knowing that the receiver has a certain limited amount of storage and processing power. This constrains the format and type of data that can be sent.

For instance, data requires much processing power at the receiver, or data requiring a large amount of storage for processing at the receiver cannot be sent, since it is not practical to provide a receiver It is now proposed to use storage media such as magnetic disks and semiconductor storage devices to provide storage for the transmitted digital broadcasts. The use of digital storage devices provides many enhanced applications for the user, providing a far better user experience than that of present using conventional analogue storage technologies.

The AV devices in the home can be in separate physical enclosures and needing interconnection. The key technology for interconnection of digital devices in the home is the IEEE1394 Serial Bus interface which provides a low cost, user friendly method to send audio, visual and control data between devices in the home.

Hence a typical digital TV system arrangement in the home could have a digital TV receiver, display device, magnetic storage and DVD player all connected using IEEE1394 Serial Bus connections.

Mass storage can also be alternatively or additionally provided integrated into a consumer device—for instance an integrated digital television receiver may incorporate a large magnetic storage.

Finally, it is also possible to use a "Memory Stick". This is a non-volatile memory held in a small package to allow data to be transferred between cameras, camcorders, PCs and other home AV devices. There are other formats also supported by other consumer electronics manufacturers.

FIG. 1 illustrates schematically various components of a system for receiving a broadcast data service.

A receiver 2 is provided for obtaining and demodulating transmitted data from an aerial, cable, satellite or the like. The demodulated data includes digital television data, together with associated broadcast service data.

Under the control of a control panel 4 or remote control, a video processor 6 extracts data from a received signal for a selected video channel and displays that video channel on the display 8.

A processor 10 is also provided for extracting any broadcast service data from the received signal. The processor 10 may be provided together with the receiver 2, together with the memory 12, together with the controller 14 or separately. The data is stored in a memory 12 under the control of a controller 14. A user may then select (possibly using the control panel 4) desired portions of the data broadcast service. Under the control of the controller 14, the memory 12 then outputs appropriate data for display on the display 8.

The memory 12 can be provided as a magnetic disc, for instance as is commonly known as a hard disc drive, a semiconductor memory or other means.

Figure 2:
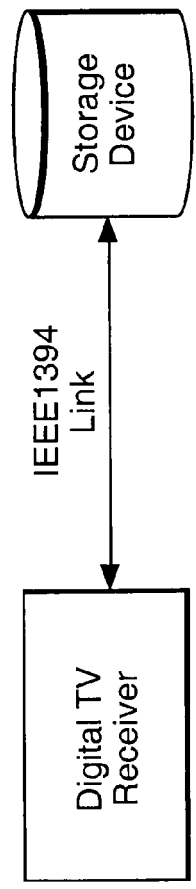
FIG. 2 illustrates a system for receiving broadcast data services according to the present invention.

The system of FIG. 1 can be provided integrally within a television unit. However, it is also possible for various components of the system to be distributed around a network, for instance using the IEEE 1394 interface. This is illustrated in FIG. 2.

The system may be provided merely with an external storage device. Similarly, the system may be provided as a broadcast service unit for connection to a television display and the broadcast service unit may itself have an internal memory or use an external memory and may itself have a processor. Just as with an integral design, the broadcast service unit can obtain received digital data from the receiver, process portions of the data appropriately and provide selected portions to the television display upon demand.

With regard to transmission bandwidth of a broadcast service, an audio/visual stream can typically consume 2 Mbit/s using current MPEG-2 compression technologies. This could be construed as wasteful.

By making use of the memory of the system, it is possible to broadcast the audio and visual data at a rate slower than real time. The audio and visual data is extracted from the broadcast data service and stored in the memory 12 of the system. When the audio/visual data is required for playback, the system can then retrieve the data at the required data rate allowing replay in real-time. In this way, by halving the broadcast rate of the audio/visual data, the bandwidth consumption of that portion of the service would also be halved. Although the cycle time would therefore also be doubled, by means of the memory of the system, access would be immediate unless a user happened to request a portion while it was being broadcast.

With the proposed mass storage technologies now being implemented in consumer audio/video devices in the home, there are significant changes in the processing potential and storage available to the digital television receiver.

Increased storage can allow different and possibly more effective compression and pre-processing to be applied to broadcast data. A large amount of storage allows broadcast to be downloaded as a whole block of data. This block of data is then processed as a whole, rather as a broadcast stream, where only a small fraction of the broadcast data is processed as it passes through the receiver. Thus, the video data can be compressed using a completely different non-streaming algorithm other than MPEG and be subjected to off-line compression/decompression as discussed.

The increased storage also allows data to be stored for later processing. This effectively increases the processing power available in the receiver. Since the data is stored "offline" the receiver can then process the data as a background task or times of low usage. When the data is fully processed then it can be made available to the user.

The video need not only be sent at slower than real time (for "trickle feed"). It could also be sent faster than real time, for instance for a mass video dump during the night.

Additionally, the data can be sent in a more interactive manner. For instance, there can be an almost permanent return channel connection from the receiver to the broadcast headend. This headend can field the requests from the receiver population and broadcast the data (video or whatever) according to the demand for each item.

In this case, heavily requested items are broadcast first. Once broadcast, the item is cached locally so that, if requested again, the receiver displays it locally. Thus, a popular item is broadcast a lot to start with and then the requests fall off and allow less popular items to be broadcast.

For a broadcast video program, it is also possible for certain sections to be marked as "highlights". Just these can then be stored, or the whole video stored, so that the highlights can be skipped between by the user later.

The "offline" processing can be carried out in different ways

It can be carried out by the processor of the digital TV receiver operating directly on the data on the mass storage device.

It can be carried out by the processor of the digital TV receiver in a "batch" processing method with the data loaded locally from the mass storage device in small chunks.

It can be performed by a processor local to the mass storage device.

There are a variety of ways of processing the data on the mass storage device to provide "post-processed" data that can then be used by the digital TV receiver.

Post-processing or decompression of data can be conducted using an existing pre-defined protocol such as "WinZip".

Post-processing or decompression of data can be conducted using a downloaded protocol.

Post processing of data can be conducted to provide a new set of data. For example, processing two video streams to provide a new video stream—perhaps a "reverse angle" or "birds eye" view of a video sequence.

Offline decryption of a file can be conducted using a key provided to the user by broadcast or other means (on memory stick or smart card).

Data may be input from another source that is then post processed using broadcast data.

Offline compression or processing of video data can be conducted (perhaps DV format data from a digital camcorder) for later re-transmission by e-mail, memory stick, i.LINK, or other means.

It could also be construed as wasteful using bandwidth to cycle the same content only with slight updates each time rather than for "real" live content such as films, news and sports broadcasts.

In a service where portions of the broadcast data service are cycled, there is a trade off between the bandwidth consumed by the service and the cycle rate. The service can offer a rapid update rate if it consumes a large amount of bandwidth. That bandwidth can be reduced, but will result in cycle time being increased.

For the broadcast of broadcast data services, such as teletext, data is cyclically processed and provided to the user. It is now proposed to provide enhanced broadcast data services which will include more data. Unless substantial bandwidth is used, this will result in extended cycle times. In particular, if an enhanced service showing audio/video clips and data has a very long cycle time, then the service will be undesirable for the intended application of a quick newsflash style update on the days news or sports events.

To overcome this problem, it is proposed to store an entire cycle of a broadcast data service such that the user can display any portion of the service instantaneously at any time. All portions of the broadcast data service of the cycle are stored in a memory. Indeed, the data portions may be obtained when a user is not viewing the broadcast data service or has the receiver on standby.

For the user of the service, the most visible parameter is the cycle rate. The viewer will want to have up-to-date information as soon as possible and will not want to have to wait. Hence, this is one of the key requirements for the service. On the other hand, for the service provider, the bandwidth consumed is probably the most important parameter. The bandwidth consumed by, in particular, data broadcast service affects the bandwidth available for other broadcast data services and television data itself. A reduction in the bandwidth available for other services is hence likely to affect the revenue available to the service provider.

For many broadcast data services, large numbers of the portions of a broadcast data service remain the same for each cycle. For instance, for traditional style pages as used with teletext, most pages might remain the same from one cycle to the next. Similarly, when transmitting audio/visual news or sports clips with a broadcast data service, it is likely that the same clips will be provided for an extended period of time during the day.

In order to take advantage of this fact, it is proposed to transmit only portions of the data broadcast service which have changed from one cycle to the next. In this way, there may be provided a relatively fast update rate for information on the service with an efficient use of bandwidth for the service provider.

A broadcast data service may take many different forms. It may be transmitted cyclically as a carousel of main information topics. It is also possible that, within each topic, further data portions are transmitted cyclically as a sub-carousel. Each data portion may consist of a traditional style page of data or may consist of other data such as image data or audio/visual data. An entire page or audio/visual data sequence can be considered as a portion or a page or audio/visual sequence can be made up of a number of portions. Irrespective, the system should provide the data in portions which can be replaced individually in such a way as to update the overall broadcast service. Hence, individual bytes of data or groups of bytes could be considered as "portions" provided that the system allows individual replacement of such portions. However, for very small portions, such as individual bytes, the protocol overhead for embodying the system is likely to be undesirably high.

For a receiver that has no previously stored content, the "differential" content will not be useful, as it will not comprise the full service. This situation will arise for instance when the memory of the broadcast service unit is first connected to the system.

Figure 3:
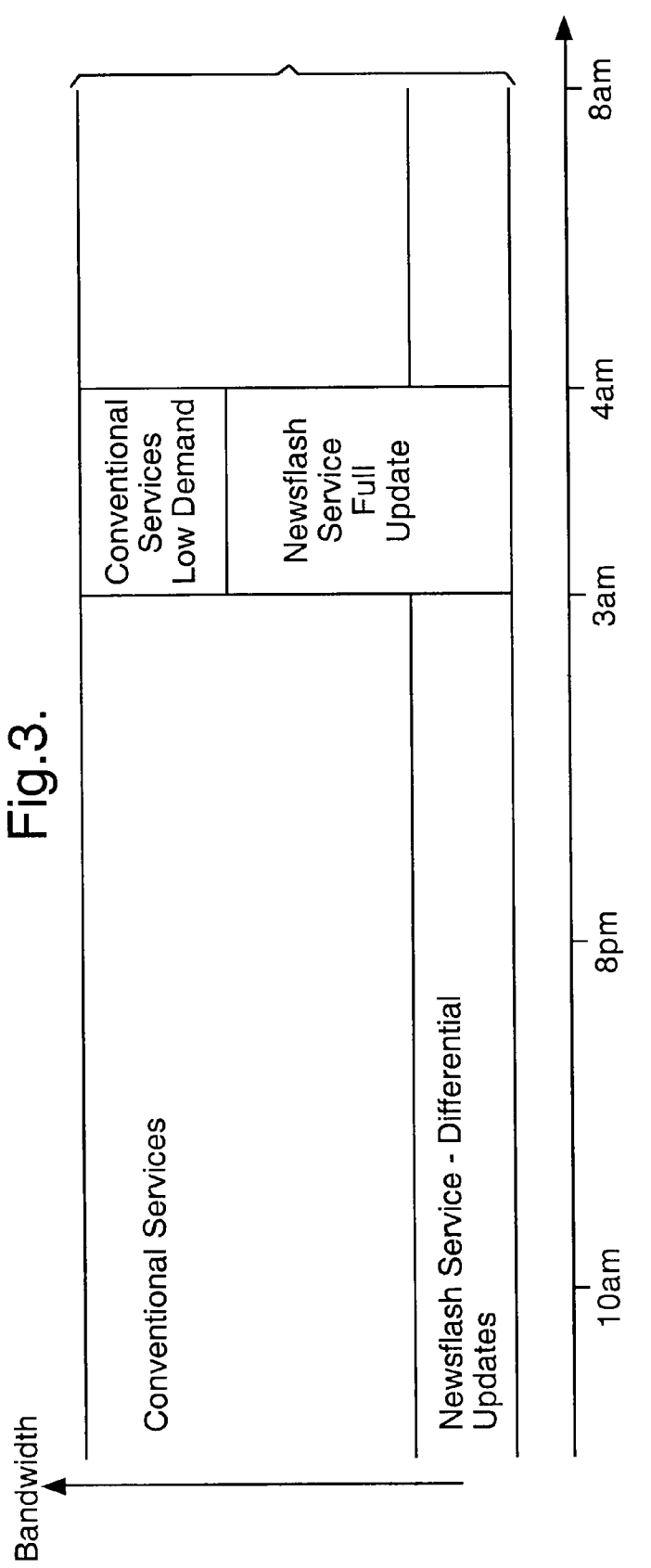
FIG. 3 illustrates the periodic transmission of a complete broadcast service.

It is possible to configure the system such that over time, by storing all of the updated portions, the complete broadcast data service will be established. Alternatively, however, the full service could be broadcast either on a different dedicated channel (possibly by means of a non-broadcast download service) or at times when the demand for other conventional broadcast is lower. Referring to FIG. 3, it will be seen that, at these times, the bandwidth allocated for those conventional services can be reduced. As a result, the bandwidth available for the broadcast data services can be increased. This allows a receiver to quickly update its stored broadcast service information with the full information service. Subsequently, in the normal way, the system can keep up to date with the service using the differential update stream.

The service provided using this system could not only carry MPEG-2 encoded audio and video data, but, as discussed above, could also carry information which has been compressed and encoded using other more suitable or efficient protocols. For instance, a football match could take advantage of the fact that most of the content features a lot of green with only a few small moving areas.

In this situation, an algorithm for decompressing and decoding could be delivered to the receiver and then executed by the receiver under a pre-defined protocol.

Since received broadcast service data is being stored off line and the decoding operation does not need to be executed in real time, the processing requirements for the decompression and decoding are not so great. Hence, the receiver processor can decode the content as a background task for display later.

It should be appreciated that the data content of the broadcast data service need not be limited to audio/visual data or traditional data pages. The content can be suitable for use by an interactive engine in the receiver/broadcast service data unit. In this way, a mixed service could be provided featuring text, graphics and audio/visual clips.

Data portions may also comprise data requiring off-line decoding. The data need not necessarily be a program, but could be any sort of data.

MPEG compression and decompression systems are designed to be used in a broadcast system with limited decompression memory in the receiver, a small delay (of the order of a second) in decode delay and a limited "pick-up" delay (where "pick-up" delay is the delay when a receiver is turned on and has to wait a few frames for a full "I-frame" when it can pick-up the transmission and start decoding).

By virtue of the present invention, it is possible to use compression/decompression programs which rely on having the whole data file present to be able to execute. In particular, by storing the data off-line, such compression/decompression becomes possible and it is possible to provide alternative compression and decompression algorithms to provide better performance than with current MPEG based schemes.

I claim:

1. A system for providing a plurality of sets of broadcast data service transmitted as part of a broadcast signal, comprising:

a processor configured to periodically extract at least some of the plurality of sets of the broadcast data service from a broadcast carousel included in the broadcast signal;

a memory configured to store the extracted plurality of sets of the broadcast data service, the broadcast data service containing digital audio/video data and defining a plurality of digital audio/video data sets, the digital audio/video data sets including television clips;

a first controller configured to allow selection from a list of the plurality of sets of the digital audio/video data sets; and a second controller responsive to a user initiated selection signal to cause the memory to output a user selected one of the plurality of digital audio/video data sets selected from the list, the selected one of the plurality of digital audio/video data sets having digital audio/video data in non-real time, wherein the processor converts the digital audio/video data of the plurality of sets of the broadcast data service into real time audio/video data, and the processor is configured to update portions of data related to the stored extracted plurality of sets, the broadcast data service is transmitted with broadcast digital television data as part of the broadcast signal, and all of the broadcast digital television data is in a first data compression format, and all of the digital audio/visual data sets are in a data compression format different from the first format.

2. The system according to claim 1, wherein the digital audio/video data of the plurality of sets of the broadcast data service is compressed and the processor decompresses the plurality of sets off-line.

3. The system according to claim 1, wherein the digital audio/video data of the plurality of sets of the broadcast data service is compressed and the processor conducts decompression using a predefined protocol.

4. The system according to claim 1, wherein the digital audio/video data of the plurality of sets of the broadcast data service is compressed and the processor conducts decompression using a downloaded protocol.

5. The system according to claim 1, wherein the processor conducts off-line decryption of the broadcast data service using a key.

6. The system according to claim 1, wherein the memory is a magnetic hard disk drive or a semiconductor memory.

7. The system according to claim 1, further comprising a digital television receiver for providing the broadcast signal to the processor.

8. The system according to claim 7, wherein at least the memory is separate from the digital television receiver and linked by means of a network connection.

9. The system according to claim 7, wherein the digital television receiver selectively provides digital television data for display and wherein the processor extracts sets of the plurality of sets of the broadcast data service irrespective of that display.

10. The system according to claim 1, wherein the second controller is also configured to identify corresponding extracted and stored sets of the plurality of sets and replaces sets in the memory with respective sets extracted from the broadcast signal.

11. The system according to claim 10, wherein, if periodically, the broadcast signal includes all of the plurality of sets of the broadcast data service, the second controller can store all of the received plurality of sets in the memory.

12. The system according to claim 10, wherein the second controller accesses an additional data channel to obtain and store in the memory all of the sets of the plurality of sets of the broadcast data service.

13. The system according to claim 1, wherein the broadcast digital television data is converted into real time audio/video data and transmitted in packets generated according to an MPEG standard.

14. The system according to claim 13, wherein the MPEG standard is an MPEG2 standard.

15. The system according to claim 1, wherein the memory outputs the selected one of the plurality of digital audio/video data sets selected from the list simultaneously with continued receipt of the broadcast digital television data.

16. The system according to claim 1, wherein the selection signal is provided at any time during receipt of the broadcast digital television data and independently of the broadcast digital television data and the second controller is responsive at any time during receipt of the broadcast digital television data and independently of the broadcast digital television data to output said selected portion.

17. The system according to claim 1, wherein the broadcast data service is broadcast on a separate channel to the broadcast digital television data.

18. The system according to claim 1, wherein the broadcast data service is broadcast on a different spectrum to the broadcast digital television data.

19. The system according to claim 1, wherein the digital audio/video data of the plurality of sets of the broadcast data service is configured in the broadcast signal for reception at a rate slower than an audio/video replay rate for the selected set.

20. The system according to claim 1, wherein only portions of data, which are required to update or replace previous portions of data, are transmitted.

21. The system according to claim 1, wherein the updating of the portions of data is performed by a separate update stream.

22. A system for providing a plurality of file based sets of broadcast data service transmitted as part of a broadcast signal, comprising:
- a processor configured to periodically extract the plurality of file based sets of the broadcast data service from a broadcast carousel included in the broadcast signal, and configured to form the extracted sets of broadcast data service into data files;
- a memory configured to store the data files formed by the processor, the broadcast data service containing digital audio/video file data and defining a plurality of digital audio/video file data sets, the digital audio/video file data sets including television clips;
- a first controller configured to allow selection from a list of a plurality of sets of the digital audio/video file data sets; and
- a second controller responsive to a user initiated selection signal to cause the memory to output a user selected one of the plurality of digital audio/video file data sets selected from the list, the selected one of the plurality of digital audio/video file data sets having digital audio/video file data in non-real time, wherein
- the broadcast data service is transmitted with broadcast digital television data as part of the broadcast signal, and
- all of the broadcast digital television data is in a first data compression format, and all of the digital audio/visual data sets are in a data compression format different from the first format.

23. The system according to claim 22, wherein the digital audio/video file data of the plurality of file based sets of the broadcast data service is compressed and the processor decompresses the plurality of sets off-line.

24. The system according to claim 22, wherein digital audio/video file data of the plurality of file based sets of the broadcast data service is compressed and the processor conducts decompression using a predefined protocol.

25. The system according to claim 22, wherein the digital audio/video file data of the plurality of file based sets of the broadcast data service is compressed and the processor conducts decompression using a downloaded protocol.

26. The system according to claim 22, wherein the processor conducts off-line decryption of the broadcast data service using a key.

27. The system according to claim 22, wherein the memory is a magnetic hard disk drive or a semiconductor memory.

28. The system according to claim 22, further comprising a digital television receiver for providing the broadcast signal to the processor.

29. The system according to claim 28, wherein at least the memory is separate from the digital television receiver and linked by means of a network connection.

30. The system according to claim 28, wherein the digital television receiver selectively provides digital television data for display and wherein the processor extracts sets of the plurality of file based sets of the broadcast data service irrespective of that display.

31. The system according to claim 22, wherein the second controller is also configured to identify corresponding extracted and stored sets of the plurality of sets and replaces sets in the memory with respective sets extracted from the broadcast signal.

32. The system according to claim 31, wherein, if periodically, the broadcast signal includes all of the plurality of file based sets of the broadcast data service, the second controller can store all of the received plurality of sets in the memory.

33. The system according to claim 31, wherein the second controller accesses an additional data channel to obtain and store in the memory all of the sets of the plurality of file based sets of the broadcast data service.

34. The system according to claim 22, wherein the broadcast digital television data is converted into real time audio/video data and transmitted in packets generated according to an MPEG standard.

35. The system according to claim 34, wherein the MPEG standard is an MPEG2 standard.

36. The system according to claim 22, wherein the memory outputs the selected one of the plurality of digital audio/video file data sets selected from the list simultaneously with continued receipt of the broadcast digital television data.

37. The system according to claim 22, wherein the selection signal is provided at any time during receipt of the broadcast digital television data and independently of the broadcast digital television data and the second controller is responsive at any time during receipt of the broadcast digital television data and independently of the broadcast digital television data to output said selected portion.

38. The system according to claim 22, wherein the broadcast data service is broadcast on a separate channel to the broadcast digital television data.

39. The system according to claim 22, wherein the broadcast data service is broadcast on a different spectrum to the broadcast digital television data.

40. The system according to claim 22, wherein the digital audio/video file data of the plurality of file based sets of the broadcast data service is configured in the broadcast signal for reception at a rate slower than an audio/video replay rate for the selected set.

41. The system according to claim 22, wherein the processor assembles the extracted plurality of file based sets of the broadcast data service for real-time display.

42. The system according to claim 22, wherein the digital audio/video file data of the plurality of file based sets of the broadcast data service is stored or transferred onto a portable storage device.

43. The system according to claim 22, wherein the digital audio/video file data of the plurality of file based sets of the broadcast data service is output in a file format corresponding to a file format of a selected device.

* * * * *